United States Patent
Taylor

(10) Patent No.: US 7,261,276 B1
(45) Date of Patent: Aug. 28, 2007

(54) FLOW REGULATOR VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 287 days.

(21) Appl. No.: 10/891,336

(22) Filed: Jul. 14, 2004

(51) Int. Cl.
*F16K 25/00* (2006.01)

(52) U.S. Cl. ............... 251/175; 251/249.5; 137/556

(58) Field of Classification Search ........... 251/172, 251/173, 175, 301–303; 137/553, 625.31
See application file for complete search history.

(56) References Cited

U.S. PATENT DOCUMENTS

| | | | | |
|---|---|---|---|---|
| 2,952,437 A * | 9/1960 | Knox | ............... | 251/171 |
| 3,273,855 A * | 9/1966 | Wells | ............... | 251/328 |
| 3,590,872 A * | 7/1971 | Baity | ............... | 137/625.46 |
| 3,696,831 A * | 10/1972 | Fowler et al. | ........ | 137/246.12 |
| 3,734,457 A * | 5/1973 | Roos | ............... | 251/173 |
| 3,749,357 A * | 7/1973 | Fowler | ............... | 251/172 |
| 4,120,482 A * | 10/1978 | Cox | ............... | 251/306 |
| 4,289,296 A * | 9/1981 | Krause | ............... | 251/306 |
| 4,304,261 A * | 12/1981 | Forester | ............... | 137/613 |
| 4,394,003 A * | 7/1983 | Whitaker | ............... | 251/173 |
| 4,532,961 A * | 8/1985 | Walton et al. | ........ | 137/625.31 |
| 4,548,385 A * | 10/1985 | Barbuto | ............... | 251/175 |
| 4,638,976 A * | 1/1987 | Souplet et al. | ........ | 251/173 |
| 4,824,074 A * | 4/1989 | Baugh | ............... | 251/172 |
| 5,025,832 A | 6/1991 | Taylor | | |
| 5,308,040 A * | 5/1994 | Torres | ............... | 251/208 |
| 5,402,821 A * | 4/1995 | Harstad | ............... | 137/556 |
| 6,045,121 A * | 4/2000 | Barker et al. | ........ | 251/306 |
| RE36,984 E | 12/2000 | Steinke | | |
| 6,279,876 B1 * | 8/2001 | Massie | ............... | 254/26 E |
| 6,594,017 B1 * | 7/2003 | Menden | ............... | 356/441 |

\* cited by examiner

*Primary Examiner*—Eric Keasel
*Assistant Examiner*—Cloud Lee
(74) *Attorney, Agent, or Firm*—Fellers, Snider, et al.

(57) ABSTRACT

An apparatus such as a multiple orifice valve (MOV) for controlling a flow of pressurized fluid. A housing directs the flow from an inlet to an outlet and supports an interior stationary surface. A moveable surface selectively impedes the flow and is disposed in facing relation to the stationary surface to form a leakage path therebetween. A sealing member is disposed in a medial portion of the leakage path so that a leakage portion of the flow passing along said path compresses the sealing member against a shoulder portion of one of the surfaces to urge the sealing member across the path and form a mass seal. Preferably, the leakage path comprises a first portion in a first direction and a second portion in a different, second longitudinal direction, and the sealing member is compressed against the shoulder portion adjacent a junction between said first and second portions.

21 Claims, 6 Drawing Sheets

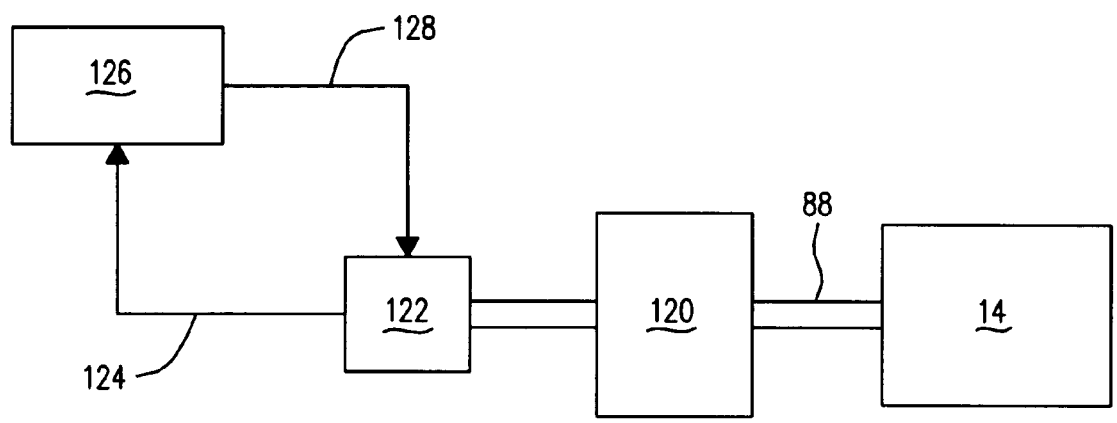
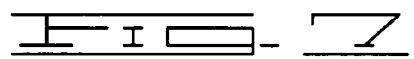

FLOW REGULATOR VALVE

FIELD OF THE INVENTION

The present invention relates generally to the field of fluidic flow control, and more particularly but not by way of limitation, to a multiple orifice valve with an improved sealing configuration.

BACKGROUND

Control valves are often used to regulate fluidic flow rates. An exemplary control valve is disclosed in U.S. Pat. No. 5,025,832 issued to Taylor, which sets forth a multiple orifice valve (MOV) having a valve body with a flow passageway extending therethrough.

The MOV includes a cylindrical disc rotating barrel having longitudinal bores rotatably disposed in the flow passageway. A pair of juxtaposed multiple orifice discs are positioned in the flow passageway adjacent the downstream end portion of the valve body. The upstream disc is pinned to, and is rotatable with, the disc rotating barrel, while the downstream disc is supported in a stationary position.

Angular rotation of the disc rotating barrel is effected by a handle that extends through a slot in the valve body to mate or mismate the orifices in the discs. This provides a flow port that can be continuously varied, or throttled, between a fully closed position and a fully open position.

While prior art control valves such as the aforementioned MOV have been found operable, there is a continual need in the art for improved valve configurations which can accommodate a wide range of fluids and operational conditions, and it is to such improvements that the present invention is generally directed.

SUMMARY OF THE INVENTION

In accordance with preferred embodiments, an apparatus is provided to control a flow of pressurized fluid. The apparatus is preferably characterized as a multiple orifice valve (MOV).

A housing directs the flow from an inlet to an outlet and supports an interior stationary surface. A moveable surface selectively impedes the flow and is disposed in facing relation to the stationary surface to form a leakage path therebetween. The stationary surface preferably comprises a surface of a stationary disc and the moveable surface preferably comprises a surface of a rotatable disc, with the discs having respective orifices which can be selectively aligned to regulate the flow through the housing.

A sealing member is disposed in a medial portion of the leakage path so that a leakage portion of the flow passing along said path compresses the sealing member against a shoulder portion of one of the surfaces to urge the sealing member across the path and form a mass seal. Preferably, the leakage path comprises a first portion in a first direction and a second portion in a different, second longitudinal direction, and the sealing member is compressed against the shoulder portion adjacent a junction between said first and second portions.

An adjustment assembly is preferably employed to move the moveable surface with respect to the stationary surface in order to regulate the fluidic flow. In some preferred embodiments, a worm gear and rack gear cooperate to rotate the moveable surface. In other preferred embodiments, a wheel handle is manually activated by a user to move the moveable surface. In yet other preferred embodiments, a motor is used to move the moveable surface.

Other advantages and features of the present invention will be apparent from the following detailed description of the preferred embodiment when read in conjunction with the accompanying drawings and appended claims.

BRIEF DESCRIPTION OF THE DRAWINGS

FIG. 7 provides a functional block diagram of an alternative construction for the adjustment assembly of FIG. 1.

DETAILED DESCRIPTION

Figure 1:
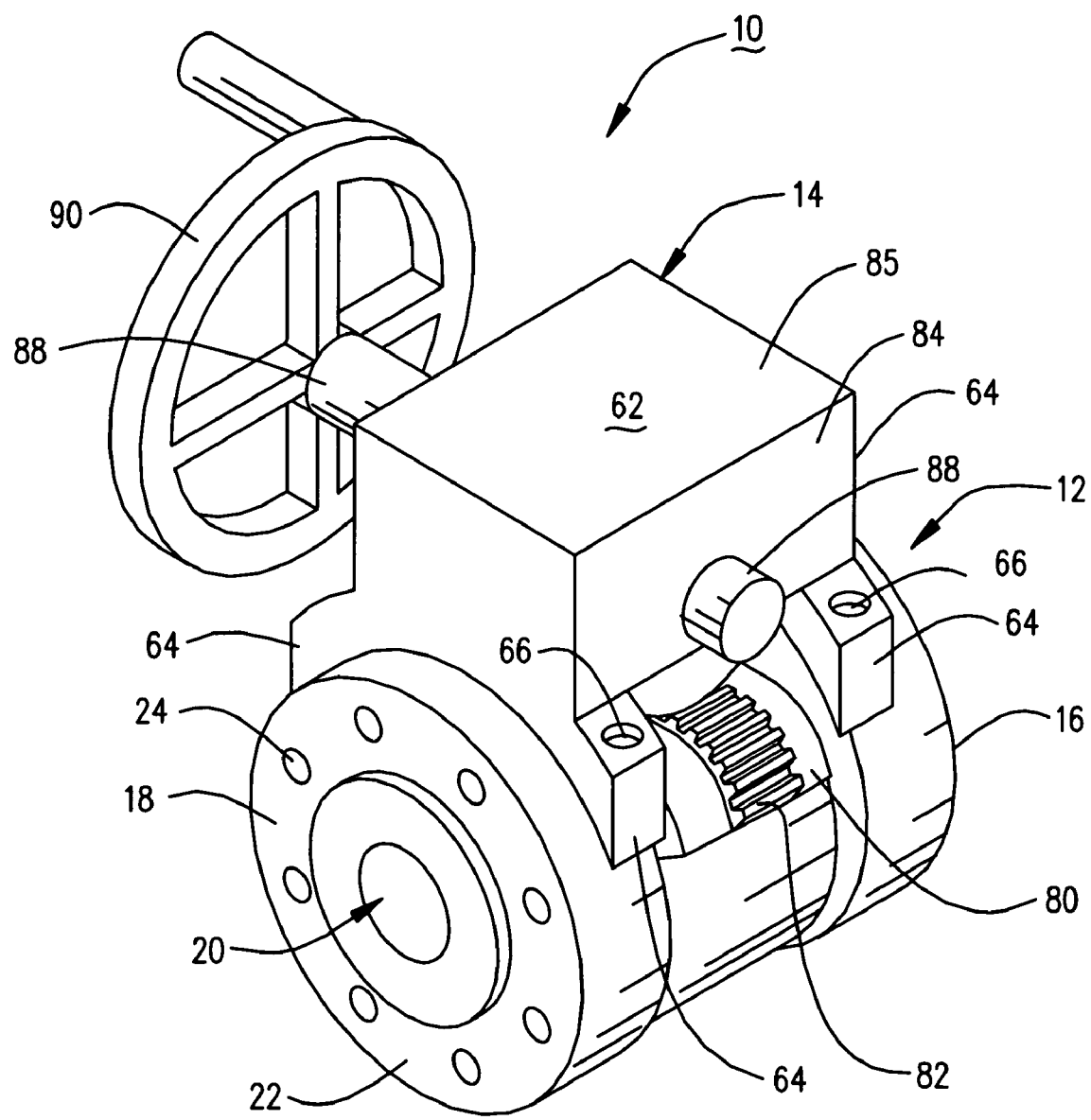
FIG. 1 is a perspective view of a fluid flow control valve constructed in accordance with preferred embodiments of the present invention.
Figure 2:
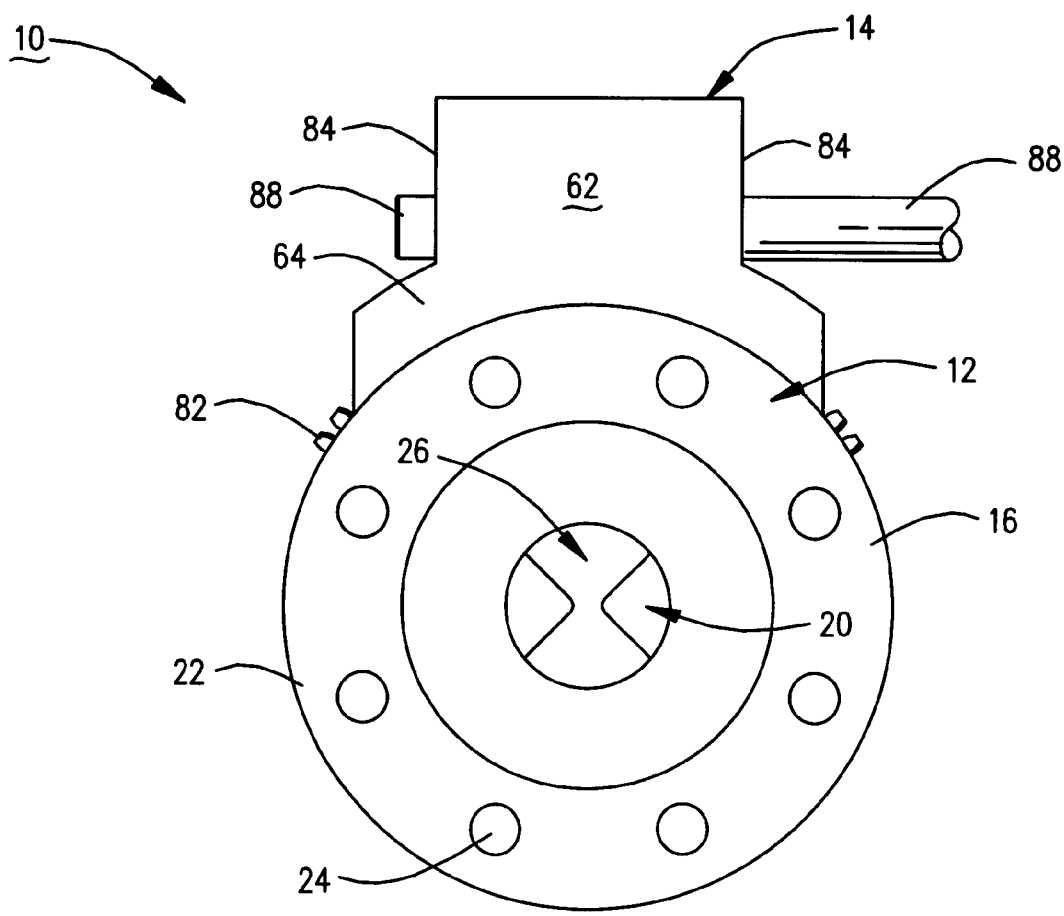
FIG. 2 is an elevational view of an outlet end of the valve of FIG. 1.
Figure 3:
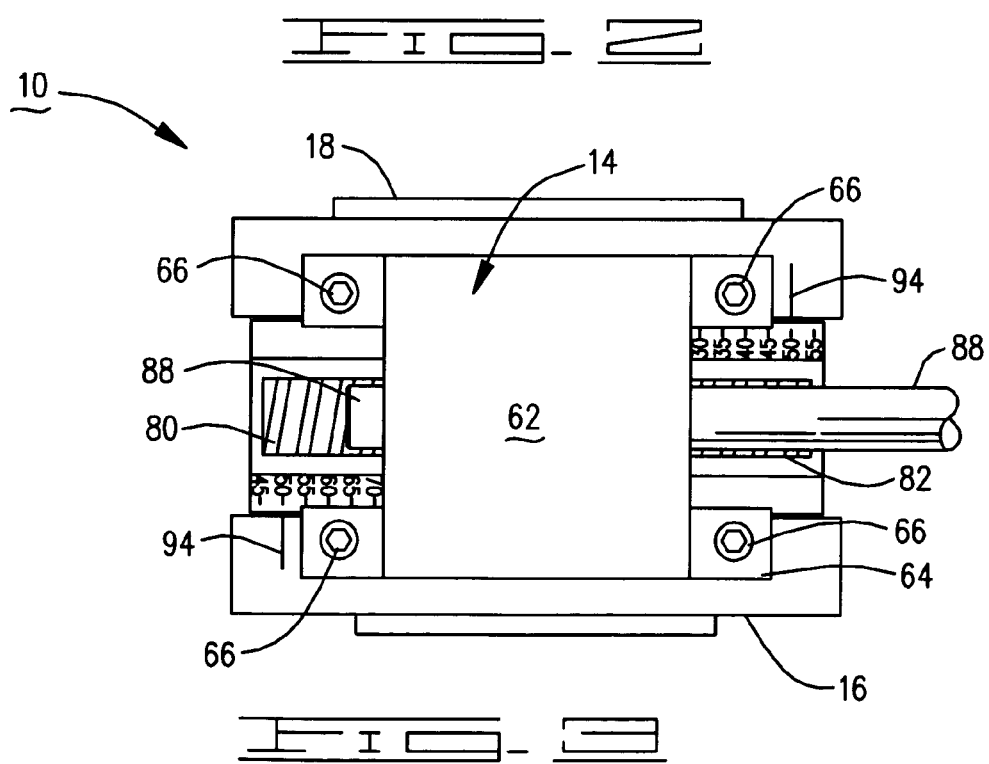
FIG. 3 is a top plan view of the valve of FIG. 1.

Referring to the drawings in general and to FIGS. 1 through 3 in particular, shown therein is a fluid flow control valve 10 constructed in accordance with preferred embodiments of the present invention. The valve 10 is preferably characterized as a multiple orifice valve (MOV), although such is not limiting to the scope of the claimed subject matter.

The valve 10 has a valve body assembly 12 that supports an orifice adjustment assembly 14. The valve body assembly 12 has a first valve body member 16 and an attached second valve body member 18. The first and second valve body members 16, 18 are co-axially bored to form a flow passageway 20 that extends between an inlet end and an outlet end thereof. Each of the first and second valve body members 16, 18 has a flange face 22 with a plurality of threaded bores (one shown at 24) for the connection of flanges of inlet and outlet conduits (not shown).

Figure 4:
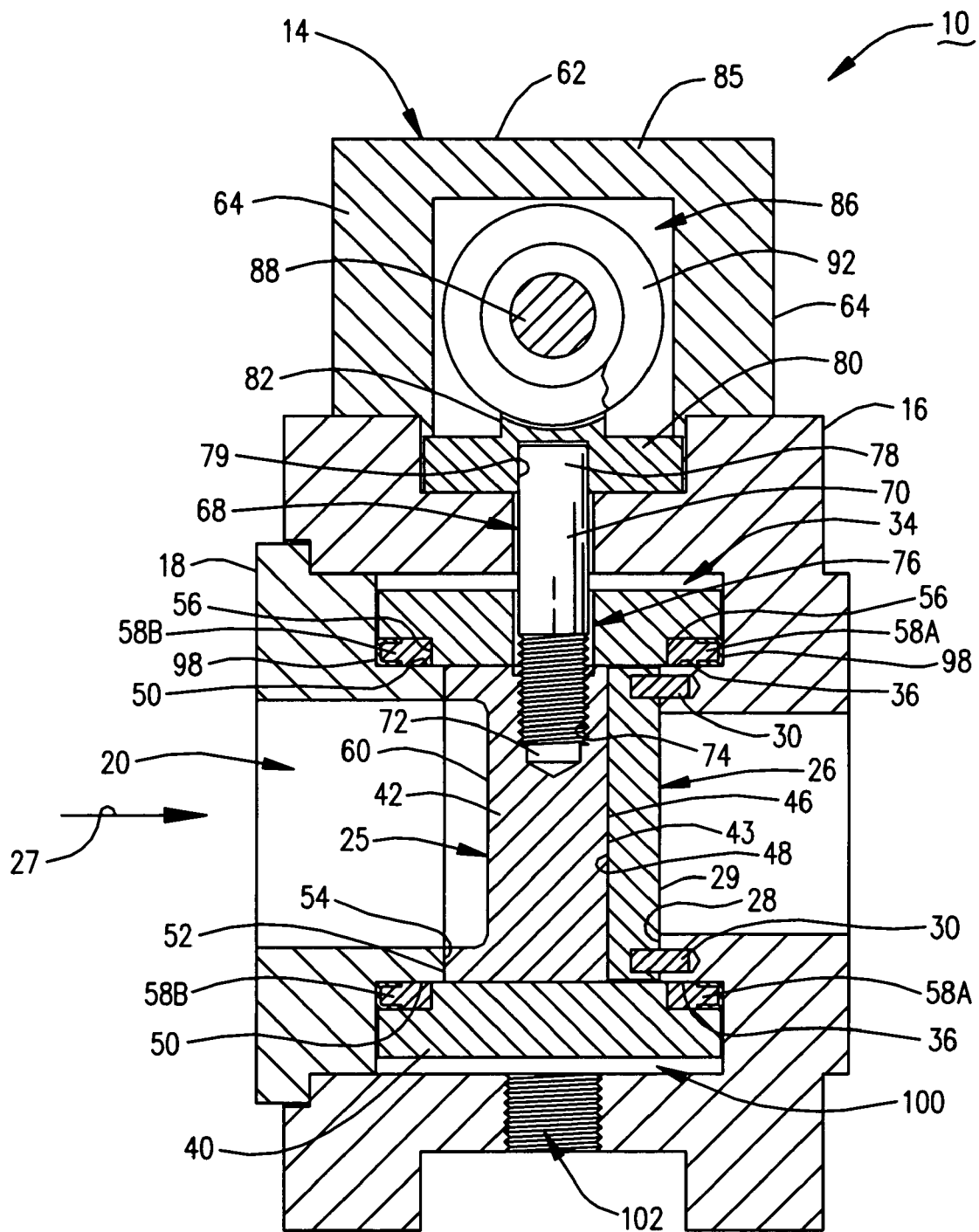
FIG. 4 is a cross sectional, elevational side view of the valve of FIG. 1.

Turning now to FIG. 4, shown therein are a pair of orifice bearing discs 25, 26, which will be referred to herein as the upstream disc 25 (also the first disc) and the downstream disc 26 (also the second disc). In a preferred embodiment as described herein, the terms "upstream" and "downstream" will be used to denote the orientation of the components of the valve 10 relative to the direction of flow through the flow passageway 20, which in FIG. 4 is in the direction depicted by flow indicating arrow 27.

Figure 5A:
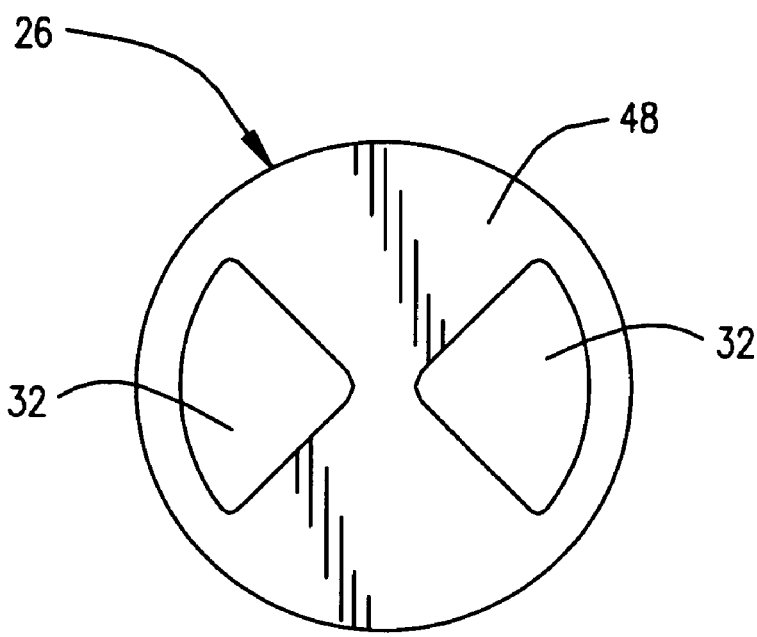
FIG. 5A is an elevational face view of a stationary downstream disc of the valve of FIG. 1.

The downstream disc member 26, also shown in FIG. 5A, is disposed in a downstream position in the flow passageway 20. The first valve body member 16 has a machined disc abutting surface 28, and the cylindrically shaped downstream disc member 26 has a downstream disc face 29 and is secured there against by stake pins 30, with the downstream disc face 29 sealingly abutting the disc abutting surface 28. The downstream disc member 26 has a pair of downstream orifices 32 (FIG. 5A).

While a pair of downstream orifices 32 are shown in a preferred embodiment of the downstream disc member 26, it will be understood that one or more such orifices is considered within the scope of the present invention. Further, the downstream orifices 32 are shown in FIG. 5A as being generally wedge shaped (e.g., like partial sectors of a circular area), but such is not limiting as the downstream orifices 32 can be any desired shape, including circular.

Continuing with FIG. 4, the first valve body member 16 is bored to form a disc receiving cavity 34 such that the first valve body member 16 has a downstream sealing shoulder 36 axially encircling the flow passageway 20, as shown. The first, upstream disc member 25, having an outer disc ring portion 40 and an inner web portion 42, is supported for rotation within the flow passageway 20. The web portion 42 is preferably shrink fitted in the outer disc ring portion 40 to form a bubble tight seal therebetween.

The dimensions of the disc ring portion 40 and the disc web portion 42 are determined to receive and abut against the cylindrically shaped downstream disc member 26 as depicted in FIG. 4. More particularly, the disc web portion 42 has a downstream surface 43 that abuts an upstream surface 48 of the downstream disc member 26. The downstream surface 43 is lapped, or polished, so as to tightly seal against the machined surface 48 of the first valve body 16. This permits these flat surfaces to slide while yet maintaining a nominally fluid tight seal.

Figure 5B:
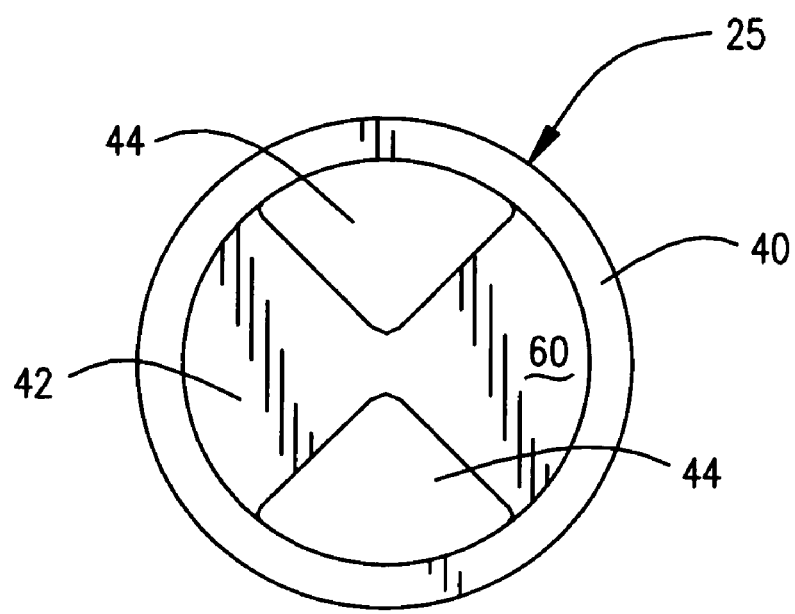
FIG. 5B is an elevational face view of a rotational upstream disc of the valve of FIG. 1.

As shown in FIG. 5B, the upstream disc member 25 has a pair of wedge-shaped upstream orifices 44 (FIG. 5B) that are disposed to mate (i.e., align) with the downstream orifices 32 in a first rotational position of the upstream disc 25 to fully open the valve 10. The upstream orifices 44 further mismate (i.e., mis-align) with the downstream orifices 32 in a second rotational position of the upstream disc 25 to fully close the valve 10. The upstream orifices 44 are further configured to be adjustably positioned between the open and closed positions to selectively throttle the fluidic flow in a throttle range between the respective rotational extents.

Preferably, the upstream and downstream orifices 44, 32 will be substantially the same in shape and size, as shown in FIGS. 5A, 5B, but it is well within the contemplation of the present invention that the number, shape, and location of the upstream and downstream orifices can be varied as desired to achieve any particularly desired flow characteristic for a specific fluid control and flow application.

Returning to the description of the disc receiving cavity 34 of the first valve body 16, this cavity is completed by the second valve body member 18 which has a portion with an external diameter sized to be fitted into central bore of the first valve body member 16 as shown in FIG. 4, and is configured to have an upstream sealing shoulder 50 that axially encircles the flow passageway. The downstream sealing shoulder 36 and the upstream sealing shoulder 50 support the disc ring portion 40, the sealing shoulders 36, 50 serving as support tracks about which the upstream disc 25 is axially rotatable.

The web portion 42 of the upstream disc 25 has a lapped, or polished, upstream face 52 that is abutted by a lapped, or polished, disc engagement face 54 on the second valve body member 18 to secure the upstream disc 25 in position as shown. The disc ring portion 40 of the upstream disc 38 has a seal groove 56 on each side in which a pair of O-ring seals 58A, 58B are disposed. The disc web portion 42 is relieved on its upstream side to form a fluid impingement surface 60.

The upstream disc 25 is rotatable by way of mechanical advantage provided by the adjustment assembly 14, as will now be discussed in detail.

With reference again to FIGS. 1-4, the adjustment assembly 14 preferably includes a gear housing 62 having spaced apart support portions 64 that are arcuately shaped to fit on the curved outer surface of the valve body assembly 12 and secured thereto via bolts 66 and appropriately threaded bores in the first valve body 16. The gear housing 62 straddles a disc access slot 68 (FIG. 4) in the first valve body 16 through which a connector post 70 extends. The inner end 72 of the connector post 70 is threaded and is engaged in a threaded bore 74 radially extending into the disc web portion 42. A clearance bore 76 is provided in the disc ring portion 40. Upper end 78 of the connector post 70 is pressed into a bore 79 in the under surface of an arcuate rack gear 80 that is shaped to be slidingly supported on the outer surface of the first valve body 16, as shown. The rack gear 80 has a plurality of upward extending gear teeth 82.

The gear housing 62 has a pair of end portions 84 that, with the side support portions 64 and a top portion 85, enclose a gear cavity 86. A gear shaft 88 extends through appropriately disposed bores in the end portions 84, and conventional bearing sleeves (not shown) serve to support and retain the gear shaft 88. A wheel handle 90 preferably is attached to a distal end of the gear shaft 88.

A worm gear 92 is mounted on the gear shaft 88 by conventional means and is supported in meshing relation to the gear teeth 82 of the rack gear 80. The rack gear 80 is slidingly moved relative to the first valve body member 16 by turning the wheel handle 90, thereby moving the connector post 70 in the disc access slot 68, which in turn rotates the upstream disc 25 on the downstream and second shoulders 36, 50 to move the upstream orifice openings 44 relative to the downstream orifice openings 32 in the stationary downstream disc 26.

Reference marks 94 are preferably inscribed on the first valve body member 16, with one such reference mark 94 preferably being on each side of the arcuate rack gear 80. On each end of the top surface of the rack gear 80. a series of numbers are preferably inscribed, with each such number having a reference mark there beside it. These numbers reflect the rotational position of the upstream disc and preferably indicate a quantification of the opening of the fluid flow port as a percentage of its total opening size. Thus, the number "50" on the arcuate rack gear 80 in FIG. 3, being aligned with the reference mark 94, indicates that the rotational position of the upstream disc is such that the fluid flow port is fifty percent open.

Figure 6:
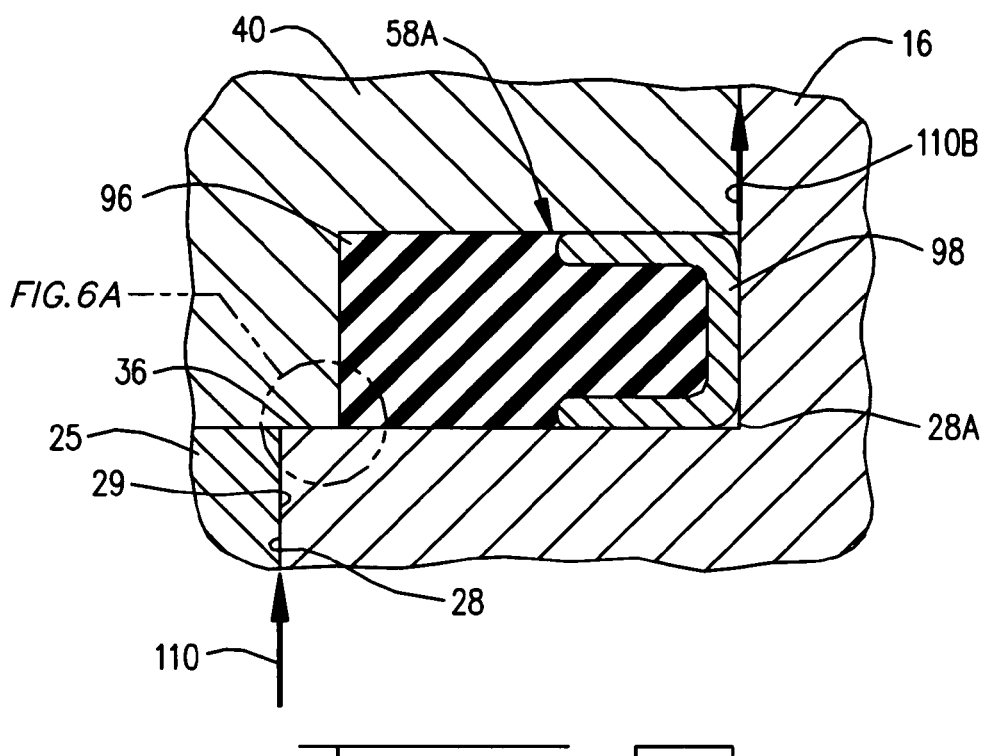
FIG. 6 provides a cross-sectional view of portions of the valve of FIG. 1 to better illustrate the downstream O-ring seal in conjunction with the upstream and downstream discs.

Reference is now made to FIG. 6 to generally illustrate preferred construction and operational aspects of the seals 58A, 58B. The downstream seal 58A is shown in FIG. 6 to comprise a body portion 96 and cap member 98. The body portion is preferably made from a suitable material such as a high temperature elastomer for temperature ranges such as below about 500° F. For higher temperature ranges such as for high pressure steam at 1000° F. or more, the body portion 96 can be made of a carbon or graphite composite material.

The cap member 98 preferably comprises a flexible seal member that is press formed about at least one circumferential edge of the body portion 96. The cap member 98 is preferably made of a suitable material such as copper, brass, bronze or other material to form a metal-to-metal seal. Preferably, the upstream seal 58B has nominally the same construction as the downstream seal 58A.

Figure 6A:
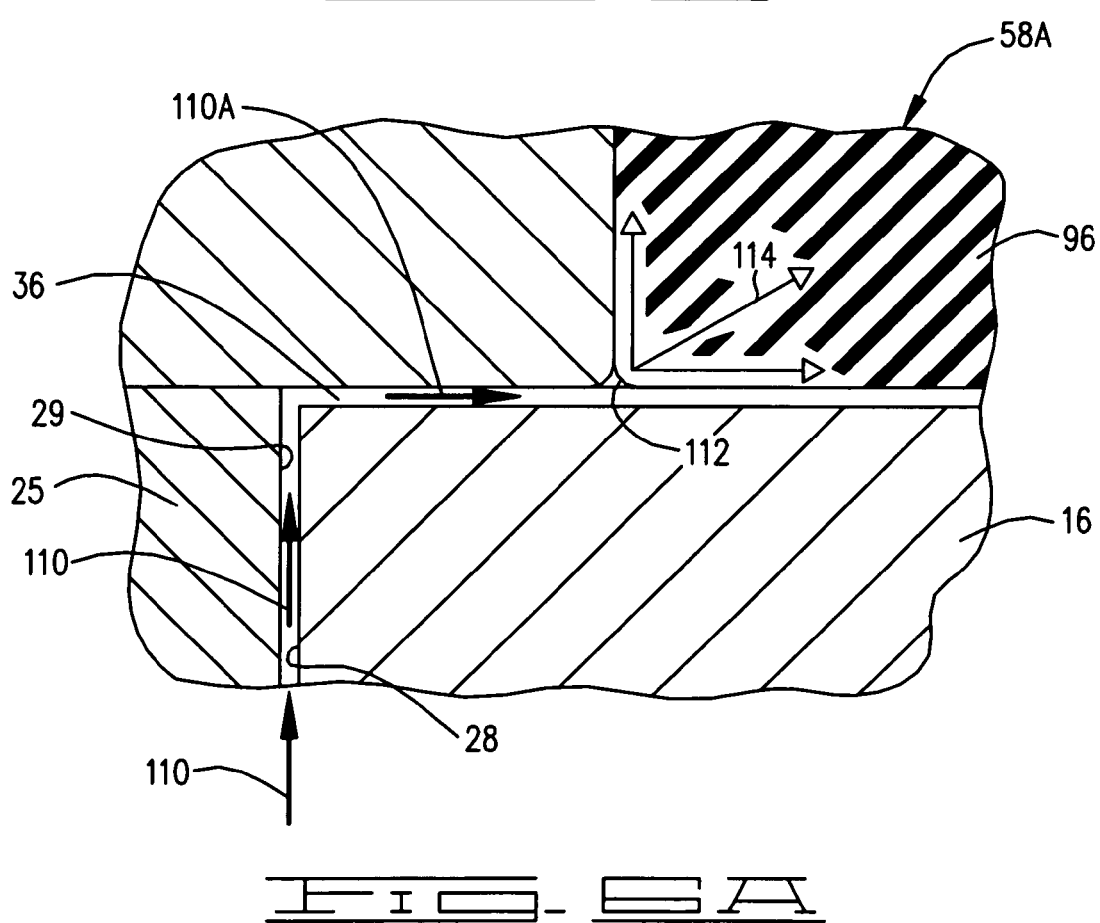
FIG. 6A generally depicts a portion of FIG. 6 to illustrate the manner in which a portion of the fluid passing along a leakage path between the upstream and downstream discs serves to compress the seal against a shoulder portion of the downstream disc and across the leakage path to effect a compressed fluidic seal.

FIG. 6A generally depicts the area in circle 6A of FIG. 6. While the various components in FIG. 6A are depicted as slightly separated for the purpose of this description, it will be understood that such interfaces are actually very closely machined and fitted.

A leakage path is defined between the respective stationary surface 28 and rotational surface 29 along which it is contemplated a portion of the flow of pressurized fluid will tend to pass between the respective discs 25, 26 and housing member 16. This path is initially denoted by arrows 110, 110A and 110B (FIGS. 6 and 6A).

The portion of the flow along path 110A (FIG. 6A) continues until the seal 58A is reached, at which point the flow imparts a compressive force against a corner 112 of the seal 58A as indicated by vector 114.

The force of vector 114 generally compresses the seal 58A against a shoulder portion (denoted at 28A in FIG. 6) of the stationary surface 28, thereby urging the cap member 98 against the shoulder portion 28A to effect a compressed fluidic seal therebetween. In this way, the pressure from any leaking fluid flow tends to urge the seal 58A against the shoulder portion 28A and across the leakage path. Unlike sheering type sealing arrangements where the leaking fluid flow tends to urge a sealing member away from the leakage path, the embodiments presented herein operate as mass sealing arrangements wherein the mass of the sealing member is jammed, or pressed, into and across the leakage path. This provides a substantially improved, more efficient seal between the respective moveable and stationary surfaces.

From FIGS. 6 and 6A it will be noted that the leakage path is preferably characterized as including a first portion extending in a first direction (such as by arrow 11A), and a second portion extending in a different, second direction (such as by arrow 110B). The seal 58A is compressed against the shoulder portion 28A adjacent the junction between the first and second portions. As shown in FIG. 6, the shoulder portion 28A is preferably arranged so as to extend substantially normal to the first portion, but such is not necessarily required.

It will be noted that the seal-interface illustrated by FIGS. 6 and 6A for the downstream seal 58A is likewise operative for the upstream seal 58B. Moreover, it will be apparent that this interface is not necessarily limited to MOV valves but rather can be utilized in any number of other types of valve constructions.

Continuing with FIG. 4, the clearance between the outer circumferential surface of the rotatable upstream disc 25 provides a leakage accumulation chamber 100, and a threaded drainage hole 102 is provided in the first valve body member 16 for disposal of such leakage. A drain plug (not shown) can be used to plug the drainage hole 102 as desired.

FIG. 7 shows an alternative preferred embodiment for the adjustment assembly, 14 of FIG. 1. Instead of the manually actuated wheel handle 90 described above, a motor 120 is connected to the gear shaft 88. An encoder 122 is actuated by the motor 120 which sends a location signal 124 to a remote computer 126. The computer 126, in response to the location signal 124, sends an operational signal 128 to actuate the motor to rotate the gear shaft 88 as required to rotate the upstream disc 25 as may be required to assume a selected setting established in the computer 126 by an operator. Appropriate feed back loops are well known and need not be described herein for persons skilled in the art.

In addition to the alternative described in reference to FIG. 7, the present invention is intended to incorporate other known means for selectively rotating the upstream disc 25 as necessary for throttling the variable flow port provided by the orifices of the first upstream and second downstream discs 25, 26. For example, it is conceivable that one may simply desire to provide a longer connector post 70 that could be manually manipulated as a single action lever.

It is now clear that the present invention is well adapted to carry out the objects and to attain the ends and advantages mentioned as well as those inherent therein. While a presently preferred embodiment of the invention has been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. An apparatus comprising:
a housing which directs a flow of pressurized fluid from an inlet to an outlet, the housing supporting an interior stationary surface;
an interior moveable surface configured to selectively impede said flow, the moveable surface disposed in facing relation to the stationary surface to from a leakage path therebetween; and
a sealing member disposed in a medial portion of the leakage path so that a leakage portion of the flow passing along said path divides into a first portion that engages a first side of the sealing member and a second portion that engages a second side of the sealing member to form a force vector therebetween that compresses the sealing member against a shoulder portion to urge the sealing member across said path, wherein said compression against the shoulder portion inhibits a sheering passage of the first and second portions beyond the sealing member;
wherein the sealing member has a substantially rectangular cross-sectional shape with respective first, second, third and fourth outwardly facing surfaces that respectively contactingly engage corresponding first, second, third and fourth inwardly directed surfaces, wherein the first portion passes along a junction between the first inwardly and first outwardly directed surfaces, wherein the second portion passes along a junction between the second inwardly and second outwardly directed surfaces, and wherein the force vector jams the third outwardly directed surface against the third inwardly directed surface and the fourth outwardly directed surface against the fourth inwardly directed surface thereby preventing further downstream flow along a fluidic path that extends from the third and fourth inwardly directed surfaces in a direction away from the sealing member to an exterior of the housing.

2. The apparatus of claim 1, wherein the first portion extends in a first longitudinal direction along an outer surface of the sealing member and the second portion extends in a different, second longitudinal direction along a second outer surface of the sealing member, and wherein the sealing member is compressed against the shoulder portion to seal a downstream junction between said first and second portions.

3. The apparatus of claim 2, wherein the shoulder portion is aligned so as to be substantially normal to the first longitudinal direction.

4. The apparatus of claim 1 wherein the force vector acts upon a first corner of the sealing member to jam an opposing corner of the sealing member into a corner junction.

5. The apparatus of claim 1, wherein the sealing member comprises an O-ring body portion and a cap member mounted on the O-ring body portion to cover at least one edge thereof, and wherein the cap member contacts the shoulder portion.

6. The apparatus of claim 5, wherein the cap member and the shoulder portion each respectively comprises metal so that the compressed fluidic seal comprises a metal-to-metal seal.

7. The apparatus of claim 1, wherein the flow of pressurized fluid comprises steam.

8. The apparatus of claim 1, wherein a selected one of the stationary and moveable surfaces includes a recess formed therein sized to accommodate the sealing member, and wherein the shoulder portion is disposed on the remaining one of the stationary and moveable surfaces.

9. The apparatus of claim 1, further comprising an adjustment assembly configured to selectively move the moveable surface between an open position and a closed position.

10. An apparatus comprising:
a valve body assembly defining a flow passageway with a fluid inlet and a fluid outlet to accommodate a flow of a pressurized fluid;
a downstream disc disposed in the flow passageway and having at least one downstream orifice in fluidic communication with the flow passageway;
an upstream disc disposed in the flow passageway adjacent the downstream disc to form a leakage path therebetween, the upstream disc having at least one upstream orifice in fluidic communication with the flow passageway;
an adjustment, assembly configured to rotate the upstream disc between first and second throttle positions to form a variable flow port, the upstream and downstream orifices being aligned in the first throttle position and mis-aligned in the second throttle position; and
a sealing member compressed between the upstream and downstream discs so that a leakage portion of the flow passing along said path acts upon opposing sides of the sealing member to generate an intermediate force vector that jams the sealing member into a corner junction which inhibits further passage of the flow downstream of the sealing member;
wherein the sealing member has a substantially rectangular cross-sectional shape with respective first, second, third and fourth outwardly facing surfaces that respectively contactingly engage corresponding first, second, third and fourth inwardly directed surfaces, wherein the first portion passes along a junction between the first inwardly and first outwardly directed surfaces, wherein the second portion passes along a junction between the second inwardly and second outwardly directed surfaces, and wherein the force vector jams the third outwardly directed surface against the third inwardly directed surface and the fourth outwardly directed surface against the fourth inwardly directed surface thereby preventing further downstream flow along a fluidic path that extends from the third and fourth inwardly directed surfaces in a direction away from the sealing member to an exterior of the housing.

11. The apparatus of claim 10, wherein the upstream and downstream discs are configured such that the leakage path comprises a first portion which extends in a first longitudinal direction and a second portion which extends in a second longitudinal direction, and wherein the sealing member is compressed against the shoulder portion adjacent a junction between said first and second portions of the path.

12. The apparatus of claim 11, wherein the shoulder portion is aligned so as to be substantially normal to the first longitudinal direction.

13. The apparatus of claim 10, characterized as a multiple orifice valve.

14. The apparatus of claim 10, wherein the sealing member comprises an O-ring body portion and a cap member mounted on the O-ring body portion to cover at least one edge thereof, wherein the cap member contacts the shoulder portion.

15. The apparatus of claim 14, wherein the cap member and the shoulder portion each respectively comprises metal so that the compressed fluidic seal comprises a metal-to-metal seal.

16. The apparatus of claim 10, wherein the flow of pressurized fluid comprises steam.

17. The apparatus of claim 10, wherein a selected one of the upstream and downstream discs includes a recess formed therein sized to accommodate the sealing member, and wherein the shoulder portion is disposed on the remaining one of said discs.

18. The apparatus of claim 10, wherein the adjustment assembly comprises a worm gear which engages an arcuate rack gear to rotate the upstream disc.

19. The apparatus of claim 10, wherein the adjustment assembly comprises an indicator which indicates the relative rotational position of the upstream disc with respect to the downstream disc.

20. The apparatus of claim 10, wherein the adjustment assembly comprises a shaft supported by the valve body for axial rotation, and a wheel handle connected to the shaft so that turning of the wheel handle is translated into rotation of the upstream disc.

21. The apparatus of claim 10, wherein the adjustment assembly comprises a motor configured to rotate the upstream disc.

* * * * *